United States Patent [19]
Thompson et al.

[11] 3,745,674
[45] July 17, 1973

[54] HEARING TESTER

[76] Inventors: Robert C. Thompson, 812 N. Montford Ave., Baltimore, Md. 21205; Edward S. Cohn, 1909 Fairbank Rd., Baltimore, Md. 21209

[22] Filed: Feb. 3, 1972

[21] Appl. No.: 223,180

[52] U.S. Cl. .................................. 35/9 R, 179/1 N
[51] Int. Cl. ......................... G09b 7/06, A61b 5/12
[58] Field of Search .................. 35/22 R, 9 A, 8 A, 35/8 R; 179/1 N; 181/.5 G

[56] References Cited
UNITED STATES PATENTS

| | | | |
|---|---|---|---|
| 3,210,864 | 10/1965 | Tillotson et al. | 35/9 A |
| 3,536,825 | 10/1970 | Rawls, Jr. et al. | 179/1 N |
| 3,266,172 | 8/1966 | Heinberg | 35/8 R |
| 3,550,288 | 12/1970 | Svala et al. | 35/8 A |
| 3,107,440 | 10/1963 | Lovering | 35/22 R |

*Primary Examiner*—Wm. H. Grieb
*Attorney*—J. Gibson Semmes

[57] ABSTRACT

An apparatus to test the ability of a literate human to distinguish and associate among audio and multiple visual stimuli is taught. The apparatus embodies magnetic audio and magnetic or optic-like projection visual stimuli means with mechanical and electrical response, and automatic logging and read-out means.

9 Claims, 5 Drawing Figures

HEARING TESTER

BACKGROUND OF THE INVENTION

In the past, it has been known to provide various electrical apparatuses for testing individuals. For example, in the U.S. Pat. No. 3,550,288 to Svala et al., a system for presenting certain audio sounds is described. *Heinberg*, U.S. Pat. No. 3,266,172 teaches a system for presenting to a person being tested progressive visual scenes upon a screen. The scenes are synchronized with an audio presentation and a pad is provided for writing answers. In these as in other similar, automated testing systems, no provisions is made for fail-safe, automated answering, and logging of the cumulative answers for selective read-out, nor is provision made for delivering audio stimulus at a selected intensity in decibels.

PREFERRED EMBODIMENTS OF THE INVENTION

One of the objects of this invention is to provide an apparatus that will quickly, simply and without fail test a person as to his ability to associate audible sounds with visual scenes and to give automated, reliable test read-out. The apparatus contemplated in this invention requires relatively few parts of moderate size so as to be relatively portable and economically manufactured.

Figure 2:
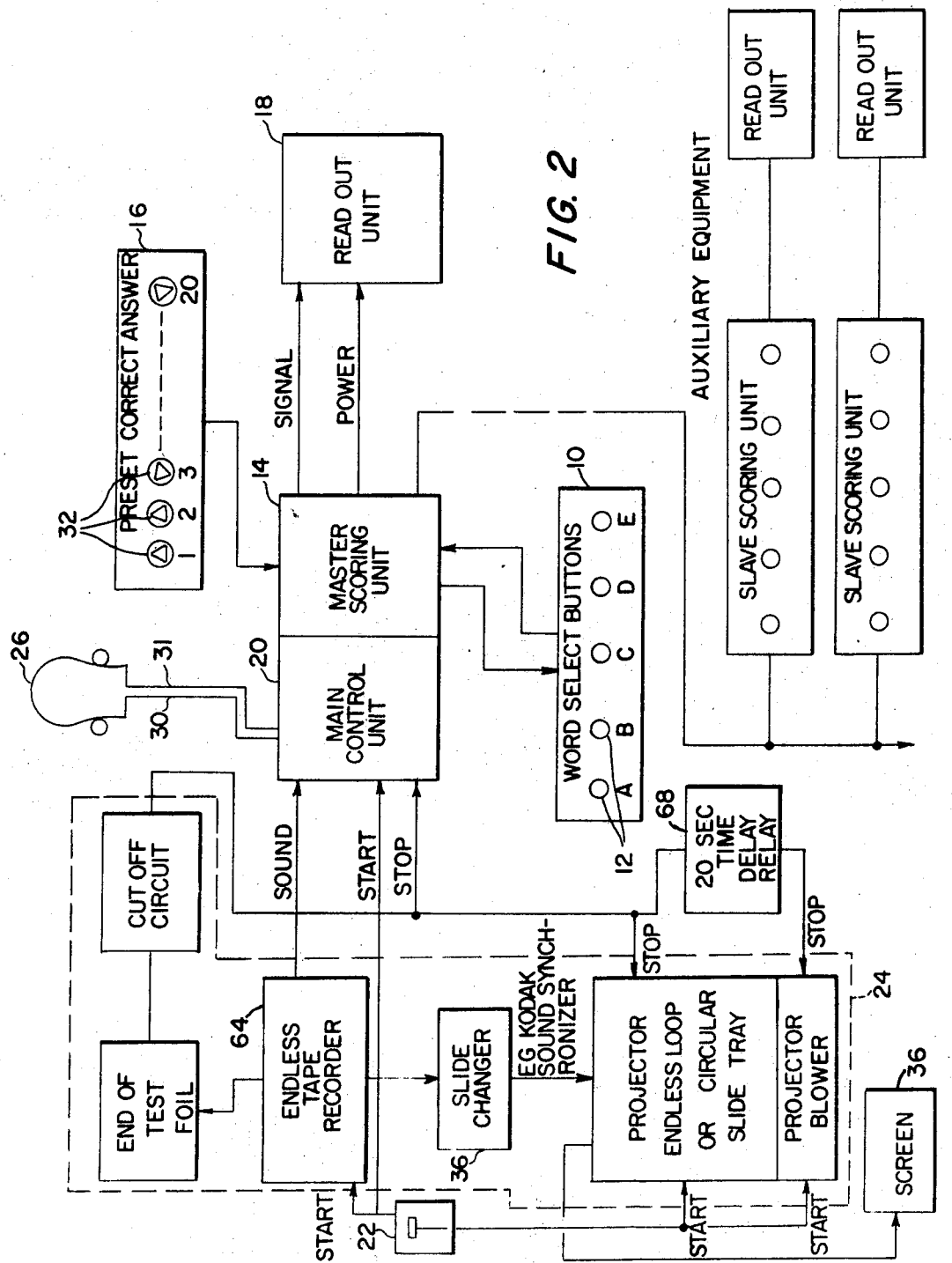
FIG. 2 illustrates a block diagram of the apparatus, showing functional connections between the interacting parts.

The invention is schematically, in block diagram, illustrated in FIG. 2. The person being tested is placed within easy access to starting switch 22 and control board 10 having a plurality of switch actuators 12, which could be push buttons. The control board 10 is operatively connected to a master scoring unit 14, to which also is operatively connected a program board 16, hereinafter described more fully. The program board can be preset for comparison with the control board 10. The master scoring unit 14 is operatively connected to a read-out unit 18 so that at selected times the results of the testing can be easily and accurately presented. A main control unit 20 is operatively connected to the master scoring unit 14. A starting switch 22 is operatively connected to control unit 20. Control unit 20 selectively controls and synchronizes the system as described, which includes the sound and visual means 24 shown within dashed lines in FIG. 2. Ear phones 26 are provided so that audible signals can be faithfully given to a selected ear 28 of the person being tested. The ear phones 26 are connected to the main control unit 20 by means of cords 30 and 31.

In operation, the test conductor can preset the correct answer on the program board 16 by setting a selector 32 for each of the number of problems, in the illustration shown to be 20 in number. A person to be tested is placed so that he can at once easily reach the control board 10, see the visual screen 36 and don the ear phones 26. The switch 22 is then turned on, actuating the main control unit 20. Upon actuation of control unit 20 the sound and visual means 24 are actuated which, present a plurality of scenes upon a screen 36 in synchronization with an audible sound to the respective earphones 26. The audible sound should correspond to one of the visual scenes. There should be the same number of switch actuators 12 as there are scenes shown on the screen 36. For purposes of this illustration, five switch actuators 12 and five scenes on the screen 36 will be described, but it has been found that competent testing can be made with up to six choices without confusing the minimally intelligent literate person. The person being tested then makes an association of the audible sound with one of the visual scenes which are numbered or lettered to correspond with the numbers or letters on the switch actuators 12 on the control board 10. The person being tested then actuates the switch actuator 12 which corresponds to his choice among the visual scenes on the screen 36. A plurality of screen projections and audible sounds are then progressively advanced in synchronized mode to the eyes and to selectively each and both ears of the person being tested, and the answers are then electrically logged by the master scoring unit 14. The read-out system 18 may be designed either to give a read-out upon a switch 12 actuation, or to give a read-out automatically at the end of testing only, or at any time so chosen by a monitor. The read-out may be only a visual signal or a permanent paper or tape type impression. Regardless of the read-out method, if an incorrect switch 12 is actuated, or if none of the switch actuators 12 are operated, an incorrect answer will be logged by the master scoring unit 14. The system may be set up so there is only one screen 36 for a plurality of persons being tested, and in such a system, a plurality of read-out systems are provided, one for each control board 10.

Figure 1:
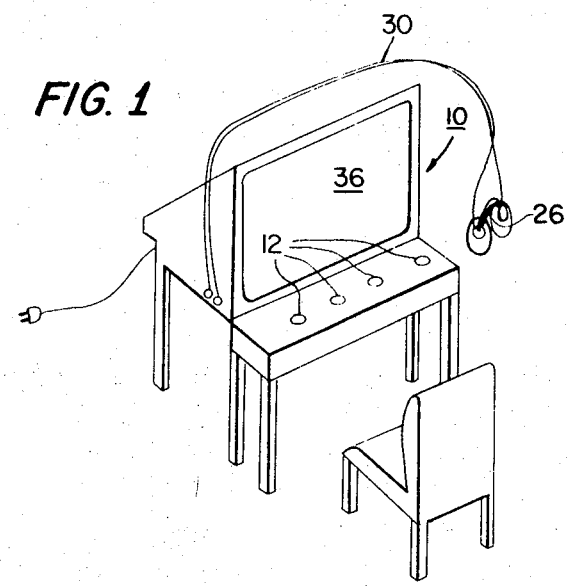
FIG. 1 illustrates a perspective view of a possible physical embodiment of the invention.
Figure 5:
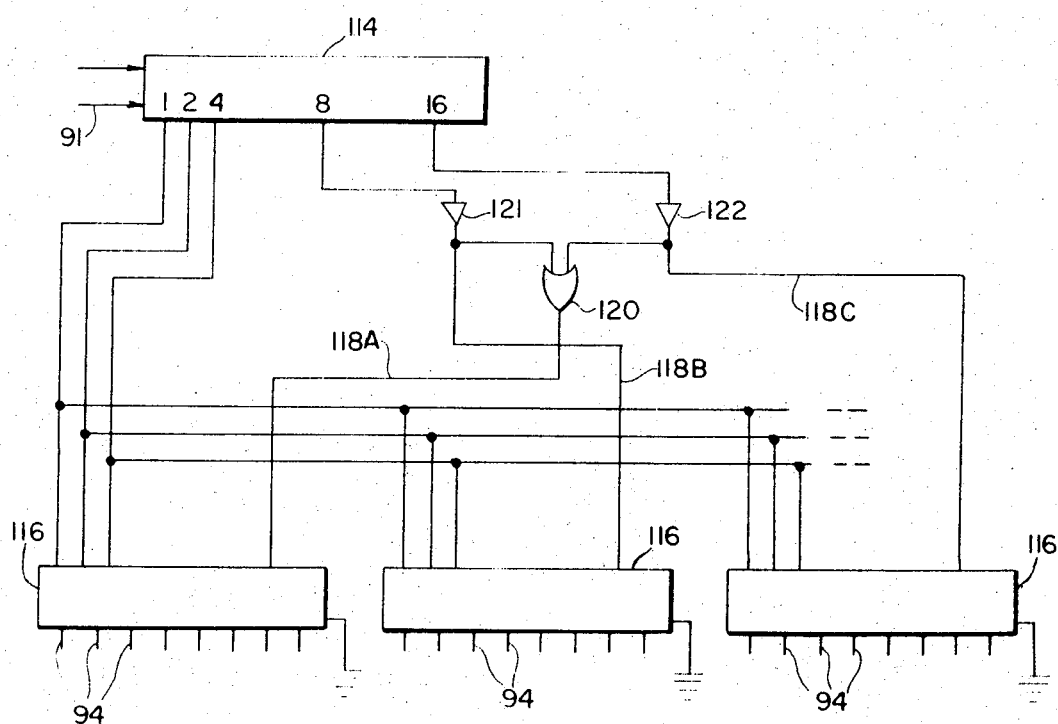
FIG. 5 illustrates electrical circuitry for an advancing signal mechanism for use in the circuit of FIG. 4.
Figure 3:
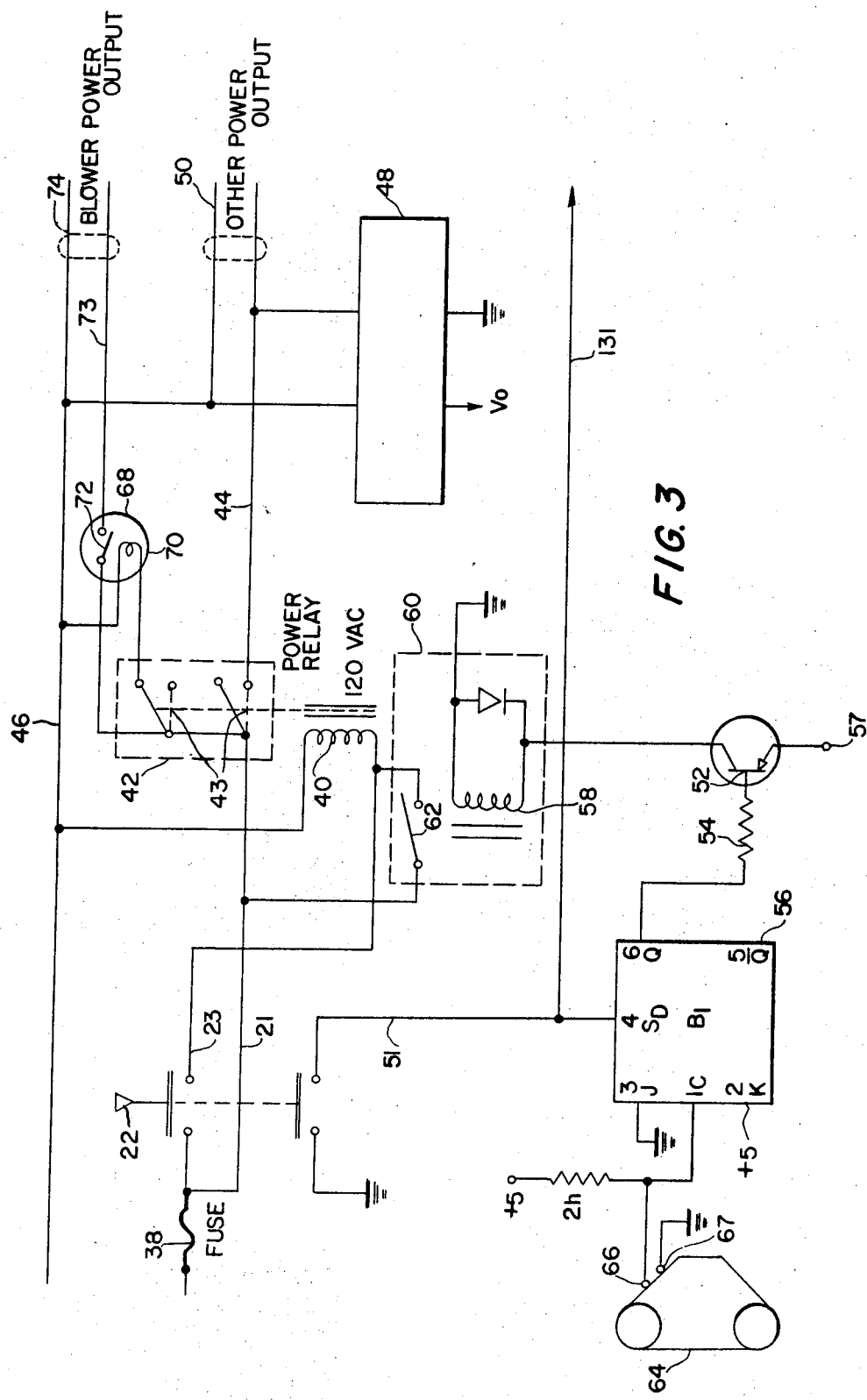
FIG. 3 illustrates electrical circuitry of an embodiment of the invention, showing the power actuating and connection circuits.
Figure 4:
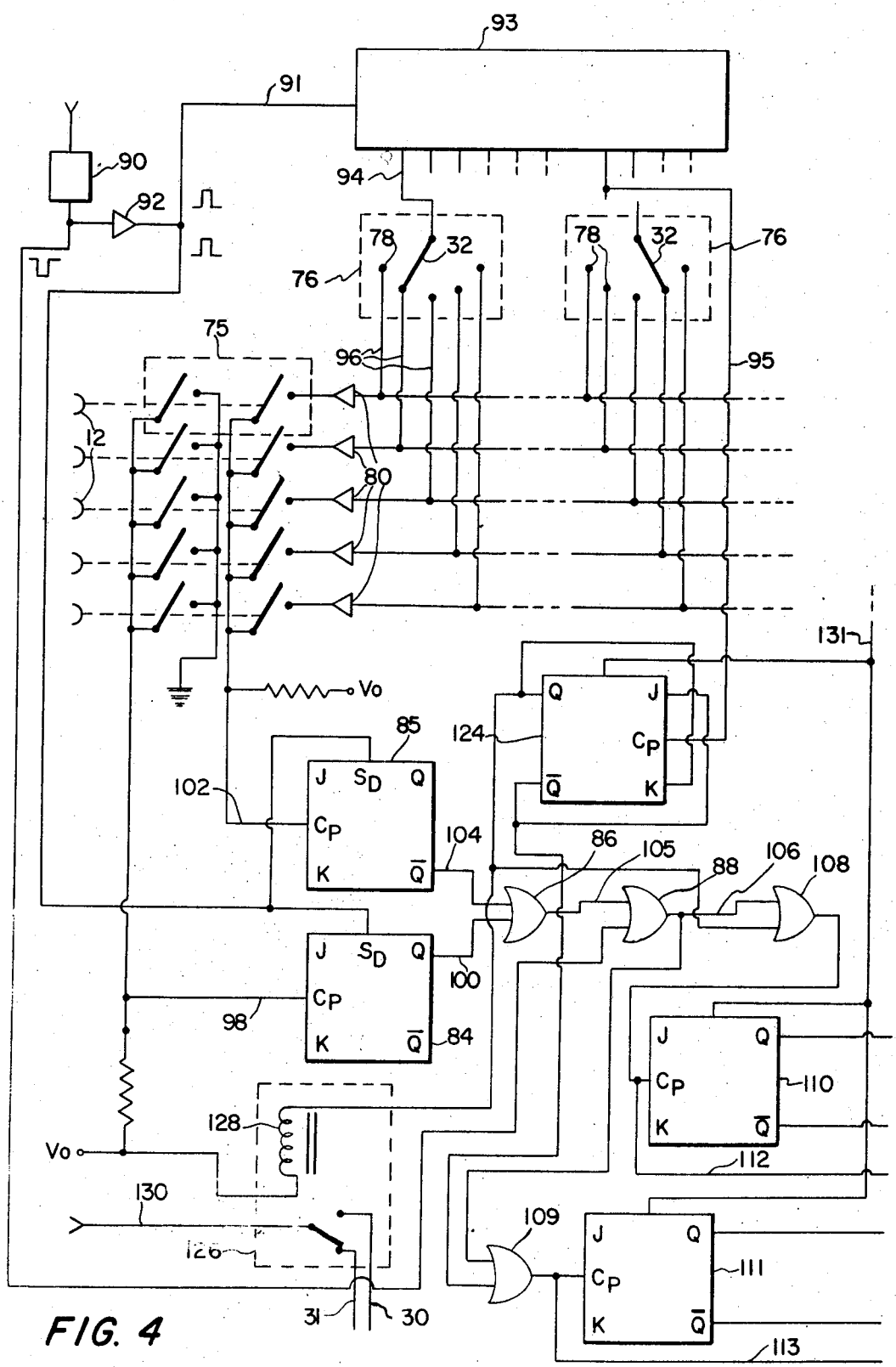
FIG. 4 illustrates electrical circuitry of an embodiment of the invention showing the manual switch analyzation and comparison circuits.

In detail, the electrical operation is explained in FIGS. 3, 4 and 5. When the electrical system is at rest, the basic circuit as shown in FIG. 3 exists. The starting switch 22 is a double-pole, single-throw, open biased type, commercially available switch. When switch 22 is actuated, power is supplied by commonly available sources of power across a standard fuse 38 designed so as to protect the circuit. Electrical current then passes through coil 40, which switches double-pole, double-throw switch 42 to the closed position, illustrated by the dotted lines 43 as shown in FIG. 3. Current and voltage are then supplied in lines 44 and 46, and power supply 48 is then actuated so as to give the scoring unit a constant direct current voltage through lead Vo.

Also, when switch 22 is actuated, bias voltage is established at the base of transistor 52 over resistor 54 through bistable multivibrator or flip-flop 56 by virtue of the conducting on of transistor within flip-flop 56 (not shown). With transistor 52 conducting, current is established through it from power supply 57 to coil 58 and coil 58. Read relay 60 closes switch 62 within the relay 60 and establishes current in coil 40, bypassing line 23 closed by switch 22. Thus, the manual pressure on switch 22 can be released and the switch 22 opened. Double-pole, double-throw switch 42 will remain then in the closed position 43.

The switch 22 also actuates the sound and visual signal means 24, reference FIG. 2. The sound means could be of ordinary magnetic type recorder constructions, but the magnetic tape 64 preferably includes an aluminum or other electrically conductive strip implanted thereon. When the tape has run and the test is over, the electrically conductive strip, positioned at the end of the program, makes momentary electrical connection between contacts 66, 67 completing the circuit and causing a pulse to appear at multivibrator or flip-flop 56, in turn causing current to cease through resistor 54 and the transistor 52 to be biased off. The electrically conductive strip connects contacts 66, 67 preferably momentarily because the strip is carried by momentum beyond the contacts 66, 67 immediately after the contact is made, but before the tape comes to a halt. Once transistor 52 ceases conductance, coil 58 in reed relay 60 is de-energized and switch 62 is opened, causing double-pole, double-throw switch 42 to return to its normal, open position, as indicated by the solid line in FIG. 3. Power is removed from the system. A timed delay switch, generally indicated at 68, can be inserted so as to provide current to a projection lamp blower, or a blower for other instruments within the system which require cooling for a period after shutdown. As can be seen in the circuit diagram in FIG. 3, when double-pole, double-throw switch 42 is in its normal, open position as shown, current is established in lines 74, 21 through coil 70 in switch 68. Thus, the switch member 72 is open circuited during these periods of non-use. When the switch 42 is caused to close, the current in coil 70 is interrupted allowing switch member 72 to close, thereby establishing current there through in line 73. When double-pole, double-throw switch 42 is switched to normal, open position, a current is re-established in coil 70, opening switch member 72 after a pre-determined delay time. The current in lines 73, 74 continues for a delayed period after shutdown until the time delay switch 68 causes switch member 72 to open. The current in coil 70 is maintained during the periods of non-use, thus keeping switch 72 open during such periods.

The visual signal and projection means could be an adaptation of an ordinary slide or movie projector, or could be derived from magnetic video tape systems. In either case, a pulse generating signal could be emitted from the sound or projection means. The emitted pulse will advance the scoring comparator means 16 as will be described below.

It is within the contemplation of this invention to use any suitable method of comparing the switch actuated by the tested person and the correct answers so as to give a quick, fool-proof read-out of whether or not error has been committed. One specific embodiment, however, has been developed and is illustrated in FIG. 4. The switch actuators 12 on control board 10 actuate double-throw, single-pole switches 75 biased open, there being a switch 75 corresponding to each actuator 12. Program board 16 is made having a plurality of multi-lead switches 76, having a plurality of contacts 78 each and one lead 96, corresponding to each switch actuator 12 respectively. One of each set of such leads corresponds to a correct test answer. Corresponding leads 96 on each switch 76 are connected in parallel to each other as shown. The parallel sets of leads 96 are connected in series with a corresponding voltage inverter 80 for each set. Each switch 76 has a selector 32 whcih can be manually set to the correct answer for the corresponding question for that switch 76. Each of the connectors of switches 75 are connected respectively to flip-flops 84, 85 at the J inputs unless otherwise shown as grounded; lead $\overline{Q}$ of flip-flop 85 and lead Q of flip-flop 84 are connected to the input of NOR gate 86. The output of NOR gate 86 constitutes one of the inputs to OR gate 88. The second input to OR gate 88 is the pulse generated by the desired switching signal received at pulse shaper 90 and synchronized with the audio and visual stimuli. Pulse shaper 90 generates a negative pulse. The pulses generated by pulse shaper 90 stimulate stepping system 93 through inverter 92 and lead 91, wherein a low voltage in the leads 94 is advanced from the first switch 76 to each succeeding switch 76 progressively upon each synchronized pulse signal from the projection means or the tape. By virtue of the selector 32 of switch 76, one of the leads 96 connected to the lead 94 which is operative at that instant has a low voltage while all remaining leads 96 are maintained in open circuit or in such a high voltage as is normally maintained in the remaining selector leads 96 on the selector 32 side of inverters 80.

Any stepping mechanism 93 can be utilized, but one that has been found satisfactory is described in FIG. 5. Pulses from pulse shaper 90 are fed by line 91 to a five bit binary counter 114. A plurality of binary to 1 of 8 decoders 116 are linked in parallel to the counter 114, and are switched on by a low voltage signal and leads 118A, 118B and 118C and so on. By virtue of AND gate 120 and inverters 121 and 122, only one decoder 116 is operative at a time. A low voltage is maintained in leads 94 successively one at a time by signals from the five bit binary counter 114.

Thus it can be seen that when a person being tested depresses the switch actuator 12 in FIG. 4 for the "correct" answer as determined by the preset selector 32, a low voltage is impressed through line 98 to flip-flop 84 causing line 100, which normally has a relatively high voltage, to become low or practically zero. No change in line 106 occurs when the pulse shaper 90 next generates a negative or low voltage pulse. OR gates 108, 109 output lines 112, 113 continue to maintain a relatively high voltage and there is no change consequently in flip-flops 110, 111 or in their output states. The high voltage pulse into line 102 as a result of depressing the "correct" actuator, causes no change in flip-flop 85 and line 104 remains low or practically zero, resulting in a positive or relatively high voltage in line 105 to OR gate 88, causing in turn a high voltage level in line 106 to OR gate 108. Line 106 normally is biased to a high voltage level. OR gate 108 then passes a positive or relatively high voltage level to flip-flop 110 which is set so that no change in output occurs.

Should the "incorrect" actuator 12 be depressed, a low or zero voltage pulse again is fed to flip-flop 84, causing line 100 again to be a relatively low voltage. A low voltage pulse is also impressed in line 102, causing flip-flop 85 to impress a relatively high voltage level in line 104 to NOR gate 86. The result is that there is low or no voltage in line 105. When the negative pulse from pulse shaper 90 arrives at OR gate 88 a negative or low voltage pulse is impressed in line 106 and OR gates 108, 109, resulting in a relatively low voltage in line 112.

If there is a failure to depress the actuator 12 during period allowed for response, the negative pulse from pulse shaper 90 and the inertial relatively low or no voltage in line 105 results in a relatively low or no voltage level in line 112.

By virtue of flip-flop 124 and coil relay single-pole switch 126, the audio stimuli can be switched from one ear to the other automatically. A lead 95 can be connected to the lead 94 corresponding to the question in which it is desired to switch the testing from one ear to the other. The low voltage in lead 95 causes bistable flip-flop 124 to maintain a high voltage in flip-flop 124 output Q̄ and a low voltage in flip-flop 124 output Q. Current then is established in coil 128, causing single pole, single throw switch 126 to change. The audio stimulus from line 130 is changed from one ear (in line 31) to the other ear (in line 30). Likewise, the high voltage is changed from input to gate 108 to input to gate 109, thus synchronizing the output lines 112, 113 with the particular ear receiving the stimulus through lines 30, 31. The audio stimulus can be changed from ear to ear as often as is desired by merely inserting additional leads 95.

One lead 94 at the end of the series of such leads 94 can be made to trigger a read-out. The read-out could either be a visual light presentation, a punched tape recording, or any of the other known read-out means. The read-out would then given either a pass or fail answer, a fail answer resulting from any occurrence of a relatively low voltage impressed in lines 112, 113 during the testing. A relatively low voltage in the last of leads 94 could also be in circuit so as to reset the advancing circuit back to the original or zero position. The read-out and resetting function could also be actuated by a separate switch operable by a tester, not shown.

As explained above, the stimuli means such as a tape for example, could include switch actuating means for automatically shutting the system off at the end of the prescribed testing sequence.

The read-out means could be arranged in several of different ways, according to the desire of the tester. A read-out could be arranged for each ear merely by connecting a separate read-out indicator, one to each of the leads 112, 113.

It has been found that communication sounds must exceed the ambient noise levels in order for essentially full receipt by a brain. In *Measurement of Hearing* by Ira Hirsch, 1952, McGraw-Hill Publishing Co., New York, N. Y., it is taught that in general approximately 4 db difference between ambient noise level and the specific communication level must exist for full syllable receipt to occur. With a selection of earphones 26 which will sufficiently block outside, ambient noises, sounds can be delivered to either ear 28 as desired, and at various sound level volumes as desired.

It is contemplated that with proper earphones and volume control mechanisms, the volume to each ear can be controlled for each question. Thus, the testing apparatus could be effectively used to quantitatively measure the intensity sensitivity of the subject individual being tested relative to the subject individual's distinguishing an associative capabilities.

We claim:

1. An apparatus for testing the hearing of an individual subject by means of synchronized audio and visual stimuli, comprising:
   A. means for producing a series of audio stimuli to at least one ear of the individual subject;
   B. means for producing a series of visual stimuli in synchronization with the series of audio stimuli, each visual stimulus comprising a plurality of simultaneously presented scenes;
   C. means to generate electrical pulses in synchronization with both of the series of stimuli from the audio and visual means;
   D. counter means actuated by the electrical pulse generating means for producing at least one signal pulse corresponding in time to the synchronized production of each member of the series of audio and visual stimuli;
   E. adjustable switch means for manually preselecting and directing the at least one signal pulse to one of a plurality of outputs, thereby producing at the one output a first signal corresponding to a predetermined association of each audio stimulus with one of the plurality of scenes of each visual stimulus;
   F. means operable by the individual subject for producing a second signal corresponding to the individual's selected association of each audio stimulus with one of the plurality of scenes of each video stimulus;
   G. means responsive to the first and second signals for determining non-coincidence of the predetermined association of stimuli and the individual's selected association of stimuli; and,
   means connected to the coincidence means for providng cumulative indication of non-coincidence of the predetermined and selected association.

2. The apparatus as claimed in claim 1 wherein said audio stimuli producing means comprises magnetic tape playback means; said visual stimuli producing means comprises film projection means having a cooling means; and further comprising means for shutting off power to the system while allowing a timed delay shut-off of the cooling means to the visual stimuli producing means after power shut-off.

3. The apparatus as claimed in claim 2, further comprising circuit means for resetting said counter means and said coincidence means to a beginning condition.

4. The apparatus as claimed in claim 2 wherein the means for shutting off power to the system comprises:
   switch means for conveying power to the audio and visual stimuli producing means and to the electrical pulse generating means;
   solenoid coil means for activating said switch means;
   means activated by the magnetic tape playback means for deactivating the solenoid coil means and switch means; and,
   means for allowing a timed delay shut-off of the cooling means to the visual stimuli producing means.

5. The apparatus as claimed in claim 1, further comprising circuit means for actuating said indication means sequentially at a predetermined point in the operation of present program circuit means.

6. The apparatus as claimed in claim 5, said audio stimuli producing means further comprises circuit means for presenting audio stimulus selectively to each ear.

7. In an apparatus for testing the hearing of an individual subject by means of synchronized audio and visual stimuli, an improved program circuit means comprising:
   A. a first electrical pulse signal driver for generating pulses in synchronization with both of the audio and visual stimuli;

B. a plurality of leads for receiving first electrical signals driven from said first electrical signal driver;

C. counter means associated with said leads and actuated by said pulses for automatically and progressively selecting one at a time of said leads for receiving at least one first electrical signal;

D. programming means associated with each said lead for manually, selectively connecting in circuit said first electrical signal with one from a hereafter recited plurality of open circuits connected in parallel;

E. a plurality of open circuits connected in parallel;

F. means operable by the individual subject for selectively, manually, operatively closing each said circuit connected in parallel; and G. means for indicating the non-coincidental operation of the selectively, manually, operatively closed circuit with the said circuit selectively receiving said first electrical signal.

8. The apparatus as claimed in claim 7, wherein said means for indicating non-coincidental operation comprises:

G.1. means for producing a second electrical signal of predetermined magnitude when the closed circuit is non-coincidental with the circuit selectively receiving the first signal;

G.2. a flip-flop comparator circuit means for receiving and comparing the first and second signals and for transmitting a third signal when the first and second signals are non-coincidental; and, G.3. means actuated by the comparator means for indicating non-coincidence of the first and second signals.

9. The apparatus as claimed in claim 8, further comprising:

means connected in parallel with selected ones of the plurality of leads for selectively directing the audio stimuli to one or the other ear of the individual subject;

and wherein the indicating means comprises:

registering circuits for each ear of the subject individual; and, means connected in parallel with the selected ones of the plurality of leads for actuating the registering circuits in accordance with the selected ear.

* * * * *